Patented Mar. 5, 1940

2,192,386

UNITED STATES PATENT OFFICE 2,192,386

INSULIN PREPARATION AND PROCESS

Melville Sahyun and Myron Heyn, Detroit, Mich., assignors to Frederick Stearns & Company, Detroit, Mich., a corporation of Michigan No Drawing. Application December 8, 1936, Serial No. 114,767. Renewed August 5, 1939

11 Claims. (Cl. 167—75)

This invention relates to insulin preparations and processes of preparing the same.

Since the discovery of insulin the limitations of its effects have become so well known that efforts have been made to produce an insulin preparation in conjunction or in combination with either organic or inorganic compounds of such a character that the resultant mixture or combination of insulin with the added ingredient or ingredients will cause a prolongation of the hypoglycemic action of the insulin. While such efforts have produced somewhat improved results, they have not been entirely satisfactory.

By the present invention, improved results have been achieved and a more satisfactory insulin preparation than that heretofore in use is produced.

In carrying out the present invention we prefer to use as a starting material a pure preparation of insulin, for example a crystalline preparation of insulin. Advantages of starting with purified insulin are, first, that the foreign organic matter or impurities, that are as a rule associated with the commercial preparation of insulin, are eliminated, and, second, the presence of deleterious inorganic matters is avoided.

During our investigation we discovered that a certain group of organic substances or compounds, that by themselves neither exert any influence on the blood sugar content of the system nor produce any deleterious effect, may be added to or combined with insulin and thereby greatly prolong the hypoglycemic action. These organic compounds are camphor, camphoric, camphonic and camphoronic, etc., acids, their salts, and derivatives of the same. Their halogen derivatives and sulfonic acid derivatives are especially suitable for this purpose.

We have found that by taking one or more of the water soluble compounds and adding it or them to or combining it or them with insulin, the resultant mixture or compound produces a prolonged, desirable effect on the blood sugar curve of the animal system or on the blood sugar curve of the diabetic.

It is to be pointed out in this connection that, while it is preferable to use so-called crystalline insulin, salts of insulin or any commercial insulin preparations now on the market, suitable for injection in human beings, can be used.

This insulin preparation of this invention may, for example, be either: (a) in a solution made acid by adding hydrochloric, sulfuric, sulfonic, phosphoric, acetic, tartaric, lactic, etc., acids; or (b) in a precipitated or partially precipitated state at or about the iso-electric point of insulin; or (c) in a solution made slightly alkaline by adding such mild alkaline reagents as ammonia, sodium carbonate, sodium hydroxide, dibasic phosphates, or any other alkaline reagent as would cause the resultant mixture to be dissolved without substantially affecting its physiological properties.

It has also been found desirable to incorporate a buffer in the solution. For this purpose we have found that phosphate buffers, and especially monopotassium phosphate, is particularly useful for this purpose, although other buffers may be used.

After the aqueous solution of insulin and one or more of the ingredients mentioned above has been made, it may be filtered and otherwise treated so as to render the same suitable for administration to human beings in the usual manner.

Clinical investigations have shown that one injection a day of the resultant preparation was found sufficient to control the diabetes of well standardized diabetics. The clinical investigations were made with the same patients who had been receiving three or four daily injections of regular commercial insulin. Or patients who required at least three or four injections of commercial insulin per day required only one injection per day of the insulin herein described.

The following are given as illustrative specific examples of carrying out the invention, but it is to be understood that the invention is not limited to the details given in these examples or to the particular materials used or to the proportions of materials:

*Example I.*—About equal parts, say 1 gram of each, of pure dry insulin and alpha-bromo-levo-camphor-sulfonic acid are dissolved in about 200 cc. of distilled water to which is added a sufficient amount of lactic acid to cause the solids to become dissolved. The final reaction of the solution should preferably be approximately pH 3 to pH 3.5. An isotonic reagent, such as glycerol, glucose or sodium chloride, etc., and a preservative, such as phenol or tricresol, are added, then the mixture is adjusted to the desired volume and is sterilized in the usual manner.

*Example II.*—The same proportions may be used as in Example I but alpha bromo-dextro-camphor-sulfonic acid or alpha or beta bromo-racemic-camphor-sulfonic acid may be used.

*Example III.*—Instead of using dry insulin, a solution of commercial insulin may be used. In this instance, about 10 milligrams of the camphor sulfonic acid is added to approximately 100 units of insulin, either in the form of the levo or dextro or both.

We claim:

1. In the process of making an insulin preparation, the steps which comprise forming a solution of insulin and a compound selected from the group consisting of camphor, camphoric acid, a salt of camphor, a halogenated derivative of camphor and a sulphonated derivative of camphor, and adjusting the pH of the solution to be below the isoelectric point of insulin.

2. In the process of making an insulin preparation, the steps which comprise forming a solution of insulin and a compound selected from the group consisting of camphor, camphoric acid, a salt of camphor, a halogenated derivative of camphor and a sulphonated derivative of camphor, and adjusting the pH of the solution to be below the isoelectric point of insulin by the addition of an organic acid.

3. In the process of making an insulin preparation, the steps which comprise forming a solution of insulin and a sulphonated derivative of camphor and adjusting the pH of the solution between approximately pH 3 and pH 3.5.

4. In the process of making an insulin preparation, the steps which comprise forming a solution of insulin and alpha-bromo-racemic-camphor sulphonic acid, and adjusting the pH of the solution between approximately pH 3 and pH 3.5.

5. In the process of making an insulin preparation, the steps which comprise forming a solution of insulin and alpha-bromo-levo-camphor sulphonic acid, and adjusting the pH of the solution between approximately pH 3 and pH 3.5.

6. In the process of making an insulin preparation, the steps which comprise forming a solution of insulin and alpha-bromo-dextro-camphor sulphonic acid, and adjusting the pH of the solution between approximately pH 3 and pH 3.5.

7. An insulin preparation comprising a solution of insulin and a compound selected from the group consisting of camphor, camphoric acid, a salt of camphor, a halogenated derivative of camphor, and a sulphonated derivative of camphor.

8. An insulin preparation comprising a solution of insulin and a sulphonated derivative of camphor.

9. An insulin preparation comprising a solution of insulin and alpha-bromo-racemic-camphor sulphonic acid.

10. An insulin preparation comprising a solution of insulin and alpha-bromo-levo-camphor sulphonic acid.

11. An insulin preparation comprising a solution of insulin and alpha-bromo-dextro-camphor sulphonic acid.

MELVILLE SAHYUN.
MYRON HEYN.